(12) United States Patent
Alper

(10) Patent No.: US 6,703,557 B2
(45) Date of Patent: Mar. 9, 2004

(54) VEHICLE ANTISTATIC DEVICE

(76) Inventor: Philip Alper, Moshav Shorashim, D. N. Misgav (IL), 20164

( * ) Notice: Subject to any disclaimer, the term of this patent is extended or adjusted under 35 U.S.C. 154(b) by 0 days.

(21) Appl. No.: 10/156,177

(22) Filed: May 29, 2002

(65) Prior Publication Data

US 2002/0179311 A1 Dec. 5, 2002

Related U.S. Application Data

(60) Provisional application No. 60/293,933, filed on May 29, 2001.

(51) Int. Cl.$^7$ ................................................. H01B 7/00
(52) U.S. Cl. ...................... 174/5 SG; 174/5 R; 174/135
(58) Field of Search ............................. 174/5 SG, 5 SB, 174/5 R, 6, 7, 138 R; 280/636, 847, 152.2

(56) References Cited

U.S. PATENT DOCUMENTS 907,104 A * 12/1908 Brower ........................ 361/219
1,545,672 A * 7/1925 McArthur ..................... 361/215
2,318,340 A * 5/1943 Thatcher et al. ............. 361/219

FOREIGN PATENT DOCUMENTS

DE 3402754 A1 * 8/1985 ........... B62D/25/16
FR 000434540 A1 * 6/1991

* cited by examiner

*Primary Examiner*—Dean A. Reichard
*Assistant Examiner*—Jinhee Lee

(57) ABSTRACT

Apparatus for preventing electric charge accumulating on a body of a vehicle having a wheel for traveling on a surface, the apparatus including an insulator, which is adapted to be coupled to the body in a vicinity of the wheel. The apparatus further includes a conductor, having an upper end and a lower end, the conductor being coupled to the insulator so that when the insulator is coupled to the body, the upper end of the conductor is held in proximity to the wheel, while the lower end of the conductor is in proximity to the surface on which the wheel travels, and the conductor is electrically insulated by the insulator from the body.

3 Claims, 2 Drawing Sheets

VEHICLE ANTISTATIC DEVICE

CROSS-REFERENCE TO RELATED APPLICATIONS

This application claims the benefit of U.S. Provisional Patent Application No. 60/293,933, filed May 29, 2001, which is incorporated herein by reference.

FIELD OF THE INVENTION

The present invention relates generally to static electricity in vehicles, and specifically to reduction of static electricity buildup in moving vehicles insulated from the surface on which they are traveling.

BACKGROUND OF THE INVENTION

A build-up of static electricity on a conducting body of a moving vehicle, insulated from the ground, typically occurs in low humidity conditions. The build-up typically manifests itself when an occupant of the vehicle, in exiting the vehicle, touches the body of the vehicle. Charge from the conducting body is then transferred to the occupant, causing the latter to feel an electric shock which may range from a mildly unpleasant sensation to a relatively painful one.

There is a large amount of prior art concerning the reduction of static electricity generated in moving vehicles which are insulated from the ground. In an early example of the prior art, U.S. Pat. No. 907,104 to Brower describes apparatus and a method for removing static electricity from a vehicle, by electrically coupling a conducting portion of the vehicle to the ground. The coupling is performed by connecting a flexible conductor, such as a metal chain, between the conducting portion and the ground.

FIG. 1 is a schematic diagram of apparatus, for removal of static electricity from a vehicle 16, as is known in the art. A wheel 10, typically comprising a rubber tire 12, insulates a conducting body 14 of vehicle 16 from ground 18 on which the vehicle is travelling. As vehicle 16 moves, tire 12 rotates and charge separation occurs in the region where the tire contacts the ground. As is known in the art, the charge separation is significant in low humidity conditions, where the tire and the ground are relatively good insulators. The charge separation generates a static electricity charge on the circumference of the tire, and an opposite charge is generated at the same time on the ground. Depending on the conductive properties of the ground, the charge on the ground dissipates more or less rapidly. The tire rotates and the charge on the circumference of the tire is transferred to conducting body 14. The transfer occurs preferentially, as is known in the art, by charge leakage from the circumference to sharp edges or points of body 14 which are relatively close to the circumference of the tire. The transfer is facilitated by general air movement from the circumference to body 14.

Attached to body 14 is an electrical conductor 19 which electrically connects the body to ground 18 by touching both the body and the ground. Typically conductor 19 is positioned at the rear of body 14. The charge is generated on body 14, as described above, then leaks from the body to the ground via conductor 19.

Unfortunately, if conductor 19 comprises a chain, the chain is not always in contact with the ground as vehicle 16 travels. Also, bottom links of the chain may break off. If conductor 19 comprises a conducting strap, the strap tends to be permanently bent by air pressure so that it does not contact the ground. Although conductor 19 may still facilitate leakage of charge to ground even if it does not touch the ground, by leakage from its end close to the ground, its efficiency is reduced. Especially in low humidity conditions, the effective conductivity of the ground may be relatively low, so that even if conductor 19 does contact the ground, the rate of dissipation of charge from body 14 is also low. Prior art methods have attempted to overcome these and other problems in the system illustrated in FIG. 1. For example, U.S. Pat. No. 2,318,340 to Thacher et al., whose disclosure is incorporated herein by reference, describes a conducting strap which does not contact the ground until a moving vehicle comes to rest. However, in practice, static charge does build up on moving vehicles, and continues to be a problem when the vehicles have stopped, notwithstanding systems known in the art for reducing or eliminating the charge.

SUMMARY OF THE INVENTION

It is an object of some aspects of the present invention to provide a method and apparatus for reducing the build-up of static charge on vehicles moving on insulated wheels.

In preferred embodiments of the present invention, a conductor, most preferably in the form of a conducting strip, is attached by an insulator to a body of a vehicle, so that there is substantially no electrical conduction between the conductor and the body of the vehicle. The vehicle is supported on insulated wheels, typically each wheel having a corresponding rubber tire. The conductor is positioned in proximity to one of the wheels, most preferably between a circumference of the wheel and the body of the vehicle. An upper end of the strip is positioned close to, or touches, the circumference of the wheel, and a lower end of the strip is positioned close to, or touches, a surface on which the wheel is traveling. Most preferably, the upper and lower ends of the strip respectively comprise one or more sharp points or edges. Most preferably, a conducting strip as described hereinabove is positioned between each of the vehicle's wheels and the body of the vehicle.

As the vehicle travels, charge is generated on the circumference of the wheels as described in the Background of the Invention. The charge is removed from the wheels by the upper end of the conductor before it can be transferred to the body of the vehicle, and the charge is transferred to the surface on which the wheel is traveling by the lower end of the conductor. The transfer at the lower end of the conductor is facilitated by the lower end being relatively close to the wheel and to the surface which, especially in low humidity conditions and/or with low surface conductivity, comprises opposite charges to the charge generated. Thus, unlike systems known in the art, the charge generated by the friction of the wheels is returned to the surface on which the wheel is traveling before being allowed to charge the body of the vehicle.

In some preferred embodiments of the present invention, the insulator comprises a mud-flap which is fixedly connected by one side of the mud-flap to the body of the vehicle. The connecting strip is fixedly connected to a second side of the mud-flap. In some preferred embodiments, the connecting strip is retrofitted to an existing mud-flap. In some preferred embodiments of the present invention, the mud-flap comprises an anti-back-splash covering, and the conductor comprises at least part of the covering.

There is therefore provided, in accordance with a preferred embodiment of the present invention, apparatus for preventing electric charge accumulating on a body of a vehicle having a wheel for traveling on a surface, the apparatus including:

an insulator, adapted to be coupled to the body in a vicinity of the wheel; and a conductor, having an upper end and a lower end, the conductor being coupled to the insulator so that when the insulator is coupled to the body, the upper end of the conductor is held in proximity to the wheel, while the lower end of the conductor is in proximity to the surface on which the wheel travels, and the conductor is electrically insulated by the insulator from the body.

Preferably, the wheel includes a circumference of the wheel, and the conductor is held in proximity to the circumference.

Preferably, the conductor is positioned between the circumference and the body of the vehicle.

Preferably, at least a part of the upper end of the conductor touches the wheel.

Alternatively or additionally, at least a part of the lower part of the conductor touches the surface.

Preferably, the conductor is positioned behind the wheel.

Further preferably, the conductor is positioned behind the wheel relative to a forward direction of travel of the vehicle.

Preferably, at least one of the upper end and the lower end of the conductor include one or more sharp points.

Alternatively or additionally, at least one of the upper end and the lower end of the conductor include one or more sharp edges.

Preferably, the conductor includes one or more sharp points held in proximity to the wheel and intermediate the upper and lower end of the conductor.

Preferably, the insulator includes a mud-flap.

Further preferably, the mud-flap includes an anti-back-splash covering, and the conductor includes at least a part of the anti-back-splash covering.

Preferably, the mud-flap includes an existing mud-flap, and the conductor is retrofitted to the existing mud-flap.

Preferably the apparatus includes a secondary conductor having a secondary upper end and a secondary lower end, wherein the upper secondary end is electrically coupled to the body and the lower secondary end is in proximity to the surface.

Further preferably, the secondary conductor is coupled to the insulator and is electrically insulated from the conductor thereby.

Preferably, the lower end of the conductor is in proximity to the wheel.

There is further provided, according to a preferred embodiment of the present invention, a method for preventing electric charge accumulating on a body of a vehicle having a wheel for traveling on a surface, including:

coupling an insulator to the body of the vehicle in a vicinity of the wheel; and coupling a conductor having an upper end and a lower end to the insulator so that when the insulator is coupled to the body, the upper end of the conductor is held in proximity to the wheel, while the lower end of the conductor is in proximity to the surface on which the wheel travels, and the conductor is electrically insulated by the insulator from the body.

Preferably, the wheel includes a circumference of the wheel, and coupling the conductor includes holding the conductor in proximity to the circumference.

Further preferably, coupling the conductor includes positioning the conductor between the circumference and the body of the vehicle.

Preferably, coupling the conductor includes at least a part of the upper end of the conductor touching the wheel.

Alternatively or additionally, coupling the conductor includes at least a part of the lower end of the conductor touching the surface.

Preferably, coupling the conductor includes positioning the conductor behind the wheel.

Further preferably, positioning the conductor behind the wheel includes positioning the conductor behind the wheel relative to a forward direction of travel of the vehicle.

Preferably, at least one of the upper end and the lower end of the conductor include one or more sharp points.

Alternatively or additionally, at least one of the upper end and the lower end of the conductor include one or more sharp edges.

Preferably, the conductor includes one or more sharp points held in proximity to the wheel and intermediate the upper and lower end of the conductor.

Preferably, the insulator includes a mud-flap.

Further preferably, the mud-flap includes an anti-back-splash covering, and the conductor includes at least a part of the anti-back-splash covering.

Further preferably, the mud-flap includes an existing mud-flap, and coupling the conductor includes retrofitting the conductor to the existing mud-flap.

Preferably, the method includes coupling a secondary conductor having a secondary upper end and a secondary lower end so that the upper secondary end is electrically coupled to the body and the lower secondary end is in proximity to the surface.

Alternatively or additionally, coupling the secondary conductor includes coupling the secondary conductor to the insulator so that the secondary conductor is electrically insulated from the conductor.

Preferably, coupling the conductor includes positioning the lower end of the conductor in proximity to the wheel.

The present invention will be more fully understood from the following detailed description of the preferred embodiments thereof, taken together with the drawings, a brief description of which follows.

DETAILED DESCRIPTION OF PREFERRED EMBODIMENTS

Figure 1:
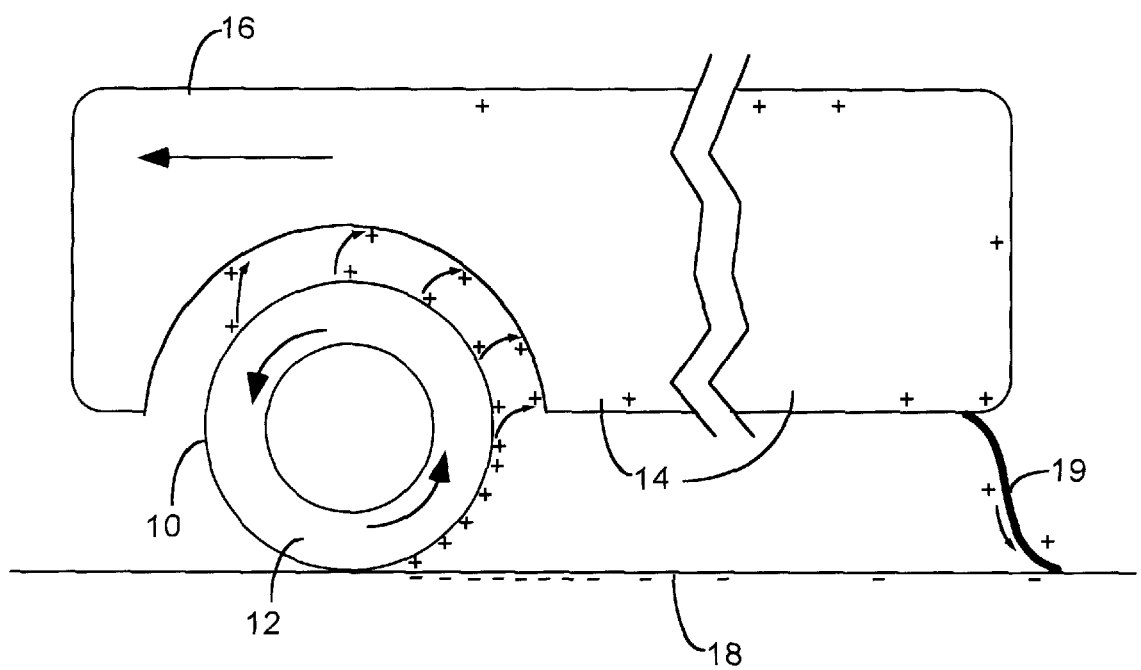
FIG. 1 is a schematic diagram of apparatus for removal of static electricity from a vehicle, as is known in the art.
Figure 2:
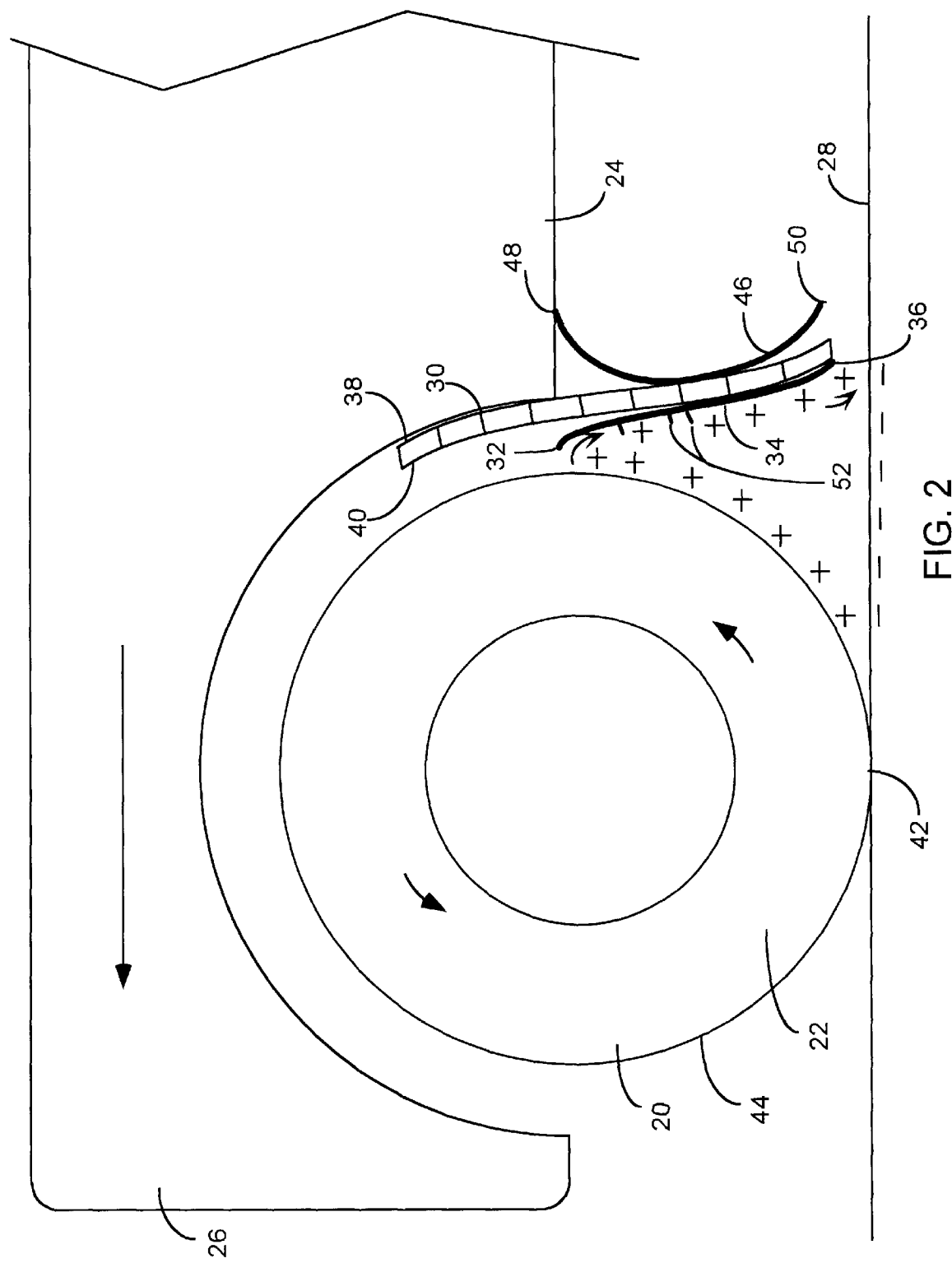
FIG. 2 is a schematic diagram of a travelling vehicle having apparatus for removal of static electricity from the vehicle, according to a preferred embodiment of the present invention.

Reference is now made to FIG. 2, which is a schematic diagram of a travelling vehicle 26, according to a preferred embodiment of the present invention. Vehicle 26 comprises a conducting body 24, and for clarity the vehicle is assumed to travel to the left over a surface 28, although it will be understood that preferred embodiments of the present invention operate irrespective of the direction of travel. Vehicle 26 is supported on one or more wheels 20, typically by four wheels, each wheel comprising an insulating tire 22, so that body 24 is effectively insulated from surface 28.

Between each wheel 20 and body 24 a respective insulator 30, having an outer side 38 and an inner side 40, is mounted on the body, by coupling the outer side of the insulator to the body. Most preferably, each insulator 30 comprises an insulating mud-flap for its respective wheel 20, being positioned behind the wheel, i.e., to the right of the wheel. Alternatively, insulator 30 comprises any other insulator which is mounted on body 24. A conductor 34, preferably in the form of a strip or band, is mounted in a generally vertical orientation on inner side 40 of insulator 30, so that the conductor is insulated from body 24. Alternative forms for conductor 34 are described hereinbelow. Conductor 34 comprises an upper end 32, which is positioned in proximity to tire 22, most preferably in proximity to a circumference 44 of tire 22. In some preferred embodiments of the present invention of the present invention, upper end 32 is positioned so as to effectively touch the circumference of the tire. Conductor 34 also comprises a lower end 36, which is positioned close to surface 28. In some preferred embodiments of the present invention, lower end 36 is positioned so as to effectively touch surface 28.

Upper end 32 of conductor 34 comprises one or more sharp edges and/or points, which act as regions for preferential charge transfer, as is known in the art. Preferably, upper end 32 and/or lower end 36 of conductor 34 have a width substantially equal to a width of the respective wheel next to which the conductor is positioned. Lower end 36 of conductor 34 also most preferably comprises one or more sharp edges and/or points. In some preferred embodiments of the present invention, there are one or more sharp edges and/or points 52 on conductor 34, intermediate upper end 32 and lower end 36.

It will be understood that conductor 34 comprises any generally vertical conductor having an upper end and a lower end, the upper end of the conductor being able to be positioned in proximity to wheel 20, most preferably between the wheel and body 24, and the lower end being in proximity to the surface on which the wheel is traveling. For example, conductor 34 comprises conducting mesh and/or filaments which are coupled or glued to insulator 30. Alternatively or additionally, conductor 34 comprises a conducting coating applied to inner side 40 of insulator 30. Other forms for conductor 34 will be apparent to those skilled in the art, and all such forms are assumed to be comprised within the scope of the present invention.

As vehicle 26 travels to the left, a separation of charges occurs, as described in the Background of the Invention, at a respective contact region 42 of each tire 22. Hereinbelow it is assumed that positive charges are created on tire 22, and negative charges are created on surface 28, but the description below applies, mutatis mutandis, if negative charges are created on the tire and positive charges on the surface. As each wheel 20 rotates, positive charge on respective circumference 44 of each tire is transferred to upper end 32 of respective conductor 34, and to edges or points 52, in preferred embodiments where the latter are present, since these are regions for preferential charge transfer. The positive charge conducts to lower end 36, which is a region for preferential charge transfer, and positive charge is transferred therefrom to surface 28.

It will be appreciated that the transfer of positive charge from lower end 36 is facilitated both by end 36 comprising sharp points or edges, as described above, and also by the fact that negative charges are present on surface 28, the negative charges acting to attract the positive charge present on the lower end. The transfer is also facilitated by lower end 36 being relatively close to wheel 20, so that the negative charges are relatively undissipated. The attraction by the negative charges on surface 28 is particularly applicable in low humidity conditions and/or low surface conductivity conditions, since the surface charges dissipate relatively slowly under these conditions. Furthermore, as vehicle 26 travels faster, the time between separation of charges at region 42, and arrival of lower end 36 over the region, is correspondingly reduced, further facilitating transfer and effective neutralization of charges from the lower end.

In some preferred embodiments of the present invention, a generally vertical secondary conductor 46 is electrically coupled at an upper end 48 to body 24 and comprises a lower end 50 placed in contact with, or close to surface 28. Conductor 46 is substantially insulated from conductor 34. Most preferably, conductor 46 is implemented in a form generally similar to one of the forms described hereinabove for conductor 34. Most preferably, conductor 46 is positioned so that it is behind one of wheels 20, and behind respective insulator 30. Preferably, conductor 46 is coupled to outer side 38 of respective insulator 30 in a manner that insulates conductor 46 from conductor 34. Any positive charge on body 24 will be conducted to lower end 50, and will there be attracted by negative charges on surface 28 generated at the separation of charges at region 42, and not neutralized by charges from conductor 34.

It will be appreciated that each insulator 30 and its respective conductor 34 may be implemented as a single unit, preferably when vehicle 26 is produced. Alternatively, a single unit comprising insulator 30 and conductor 34 may be retrofitted to an existing vehicle. Further alternatively, an existing insulator, such as an existing mud-flap, may have a conductor retrofitted to the existing insulator. It will be further appreciated that at least part of conductor 34 may be implemented on insulator 30, such as a mud-flap, by coating the inner side of the insulator with a conducting material, such as a metallic paint. In preferred embodiments of the present invention comprising conductor 46, conductor 46 and insulator 30 are preferably implemented according to one or more of the methods described above for conductor 34 and insulator 30.

In some preferred embodiments of the present invention, insulator 30 comprises one of the anti-back-splash mud-flaps known in the art, which mud-flaps comprise on their inner side a plurality of insulated points and/or edges to reduce water splashing. At least part of conductor 34 is implemented by coating the inner side of the anti-back-splash mud-flap with a conducting material. Most preferably, the conducting material comprises a thin coating, so that after coating the effectiveness of the plurality of points and/or edges as back-splash reducers is substantially unaffected.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Apparatus for preventing electric charge accumulating on a body of a vehicle having a wheel for traveling on a surface, the apparatus comprising:

an insulator, adapted to be coupled to the body in a vicinity of the wheel; and a conductor, having an upper end and a lower end, the conductor being coupled to the insulator so that when the insulator is coupled to the body, the upper end of the conductor is held in proximity to the wheel, while the lower end of the conductor is in proximity to the surface on which the wheel travels, and the conductor is electrically insulated by the insulator from the body;

wherein the insulator comprises a mud-flap, wherein the mud-flap comprises an anti-back-splash covering, and wherein the conductor comprises at least a part of the anti-back-splash covering.

2. Apparatus for preventing electric charge accumulating on a body of a vehicle having a wheel for traveling on a surface, the apparatus comprising:

an insulator, adapted to be coupled to the body in a vicinity of the wheel;

a conductor, having an upper end and a lower end, the conductor being coupled to the insulator so that when the insulator is coupled to the body, the upper end of the conductor is held In proximity to the wheel, while the lower end of the conductor is in proximity to the surface on which the wheel travels, and the conductor is electrically insulated by the insulator from the body; and a secondary conductor having a secondary upper end and a secondary lower end, wherein the secondary upper end is electrically coupled to the body and the secondary lower end is in proximity to the surface.

3. Apparatus according to claim 2, wherein the secondary conductor is coupled to the insulator and is electrically insulated from the conductor thereby.

* * * * *